United States Patent
Koizumi et al.

(10) Patent No.: US 10,072,813 B2
(45) Date of Patent: Sep. 11, 2018

(54) VEHICULAR LAMP HAVING LIGHT GUIDES EXTENDING IN DIFFERENT DIRECTIONS

(71) Applicant: KOITO MANUFACTURING CO., LTD., Tokyo (JP)

(72) Inventors: Hiroya Koizumi, Shizuoka (JP); Kenichi Motomura, Shizuoka (JP); Yasuo Teranishi, Shizuoka (JP); Hajime Takeda, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 8 days.

(21) Appl. No.: 14/666,534

(22) Filed: Mar. 24, 2015

(65) Prior Publication Data

US 2015/0277027 A1    Oct. 1, 2015

(30) Foreign Application Priority Data

Mar. 27, 2014   (JP) .................................. 2014-066184

(51) Int. Cl.
*F21S 41/00*    (2018.01)
*F21S 8/10*    (2006.01)
(Continued)

(52) U.S. Cl.
CPC .......... *F21S 48/215* (2013.01); *B60Q 1/0058* (2013.01); *B60Q 1/2607* (2013.01); *F21S 41/50* (2018.01); *F21S 43/14* (2018.01); *F21S 43/237* (2018.01); *F21S 43/239* (2018.01); *F21S 43/241* (2018.01); *F21S 43/243* (2018.01); *F21S 43/247* (2018.01); *F21S 43/249* (2018.01); *F21S 43/251* (2018.01); *F21S 43/315* (2018.01); *F21S 43/40* (2018.01)

(58) Field of Classification Search
CPC ........ G02B 6/0076; F21S 48/15; F21S 41/24; F21S 41/285; B60Q 1/0041; B60Q 1/0058; B60Q 1/2607; B60Q 1/30; B60Q 1/0011
USPC .................................. 362/507, 511, 540–545
See application file for complete search history.

(56) References Cited

U.S. PATENT DOCUMENTS

| | | | |
|---|---|---|---|
| 2002/0102058 A1* | 8/2002 | Hulse ..................... | B60Q 3/004 385/45 |
| 2011/0216549 A1* | 9/2011 | Futami ................. | B60Q 1/0041 362/516 |

(Continued)

FOREIGN PATENT DOCUMENTS

JP    2013-026008 A    2/2013

*Primary Examiner* — Sean Gramling
*Assistant Examiner* — Gerald J Sufleta, II
(74) *Attorney, Agent, or Firm* — Sughrue Mion, PLLC

(57) ABSTRACT

A vehicular lamp includes a light emitter, a first light guide, and a second light guide. The first light guide has a first incident surface, a first light guiding portion that guides the entering light, a first light emission surface that emits light guided by the first light guiding portion, and a first reflecting surface that reflects the light guided by the first light guiding portion in a direction toward the second light guide. The second light guide has a second light emission surface that emits light that enters the second light guide after being reflected by the first reflecting surface, and a second reflecting surface that reflects the light that enters the second light guide after being reflected by the first reflecting surface toward the second light emission surface.

9 Claims, 10 Drawing Sheets

(51) Int. Cl.
*B60Q 1/26* (2006.01)
*B60Q 1/00* (2006.01)
*F21S 41/50* (2018.01)
*F21S 43/14* (2018.01)
*F21S 43/237* (2018.01)
*F21S 43/239* (2018.01)
*F21S 43/241* (2018.01)
*F21S 43/243* (2018.01)
*F21S 43/249* (2018.01)
*F21S 43/247* (2018.01)
*F21S 43/251* (2018.01)
*F21S 43/31* (2018.01)
*F21S 43/40* (2018.01)

(56) References Cited

U.S. PATENT DOCUMENTS

| | | | | |
|---|---|---|---|---|
| 2012/0020103 | A1* | 1/2012 | Okada | B60Q 1/2607 |
| | | | | 362/510 |
| 2012/0188781 | A1* | 7/2012 | Futami | F21S 48/1154 |
| | | | | 362/516 |
| 2014/0036526 | A1* | 2/2014 | Sato | F21S 48/1154 |
| | | | | 362/518 |
| 2014/0192546 | A1* | 7/2014 | Kumar | B60Q 1/00 |
| | | | | 362/521 |
| 2014/0211493 | A1* | 7/2014 | Ichikawa | F21S 48/00 |
| | | | | 362/511 |
| 2015/0055361 | A1* | 2/2015 | Ogata | F21S 48/2237 |
| | | | | 362/511 |
| 2015/0362659 | A1* | 12/2015 | Nishihata | G02B 6/0038 |
| | | | | 362/511 |

* cited by examiner

F I G . 2
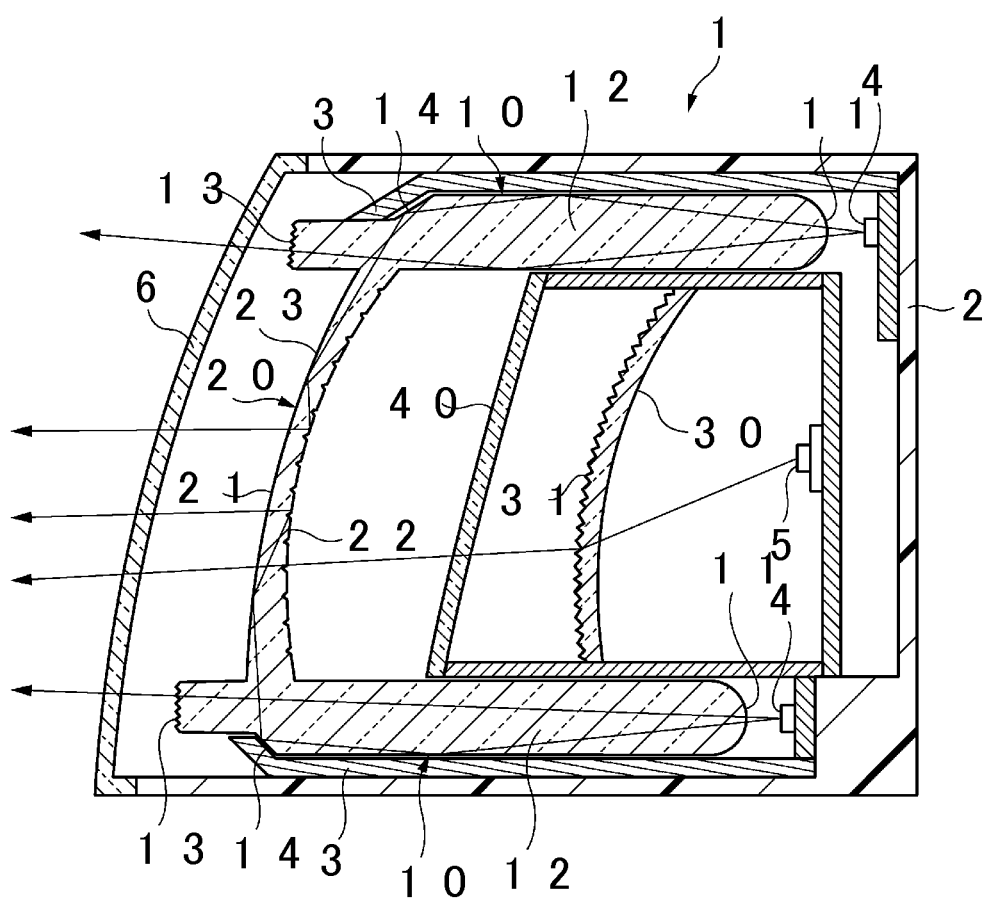

VEHICULAR LAMP HAVING LIGHT GUIDES EXTENDING IN DIFFERENT DIRECTIONS

INCORPORATION BY REFERENCE

The disclosure of Japanese Patent Application No. 2014-066184 filed on Mar. 27, 2014 including the specification, drawings and abstract is incorporated herein by reference in its entirety.

BACKGROUND OF THE INVENTION

1. Field of the Invention

The invention relates to a vehicular lamp.

2. Description of Related Art

Japanese Patent Application Publication No. 2013-26008 (JP 2013-26008 A), for example, describes a vehicular lamp that includes a light guiding plate that extends in a horizontal direction, and a light source provided to the rear of this light guiding plate. This vehicular lamp has an excellent design because the light guiding plate emits light in a line shape when viewed from the front.

SUMMARY OF THE INVENTION

The vehicular lamp described in JP 2013-26008 A emits light in a line shape, so the light emitting area is small, and consequently, the visibility may be not good. Therefore, the invention provides a vehicular lamp that broadens the light emitting area and thus provides good visibility.

An aspect of the invention relates to a vehicular lamp including: a light emitter; a first light guide that extends in a first direction; and a second light guide that extends in a second direction that intersects the first direction. The first light guide has: a first incident surface that is provided on one end of the first light guide in the first direction and receives light emitted from the light emitter; a first light guiding portion that guides light that enters the first light guide through the first incident surface to the other end of the first light guide in the first direction; a first light emission surface that is provided on the other end of the first light guide in the first direction, and emits light guided by the first light guiding portion; and a first reflecting surface that is provided between the first incident surface and the first light emission surface in the first direction and on an opposite side of the first light guiding portion from the second light guide, and that reflects light guided by the first light guiding portion in a direction toward the second light guide. The second light guide has: a second light emission surface that extends in the second direction, and emits light that enters the second light guide after being reflected by the first reflecting surface; and a second reflecting surface that is provided on a surface of the second light guide that is on a side opposite the side on which the second light emission surface is provided, and that reflects light that enters the second light guide after being reflected by the first reflecting surface, toward the second light emission surface.

With the vehicular lamp according to the aspect of the invention, a larger light emitting surface area is able to be ensured by the second light emission surface of the second light guide that extends in the second direction, in addition to the first light emission surface of the first light guide that extends in the first direction. Therefore, a vehicular lamp of good visibility is able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a sectional view taken along line II-II in FIG. 1;

DETAILED DESCRIPTION OF EMBODIMENTS

[First Example Embodiment]

Hereinafter, a vehicular lamp 1 according to a first example embodiment of the invention will be described in detail with reference to the accompanying drawings.

Figure 1:
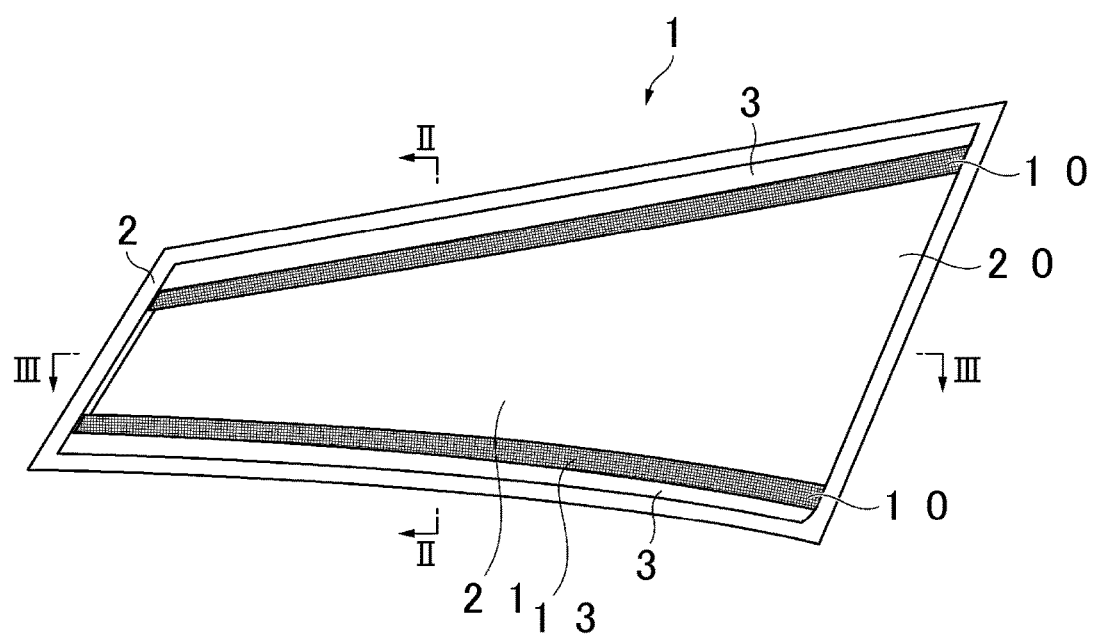
FIG. 1 is a front view of a vehicular lamp according to a first example embodiment of the invention.

FIG. 1 is a front view of the vehicular lamp 1 according to this example embodiment. The vehicular lamp 1 shown in the drawing is a rear combination lamp provided on the right side of a vehicle rear portion. As shown in FIG. 1, the vehicular lamp 1 is a generally rectangular lamp that is long in a right-left direction (or a lateral direction) in a front view. The vehicular lamp 1 includes a transparent outer cover 6 (see FIG. 2), and a housing 2 which, together with the outer cover 6, forms a rectangular internal space. Two first light guides 10, a second light guide 20, and two extensions 3 are provided in this internal space.

The two first light guides 10 are both members that are long in the right-left direction. One of the first light guides 10 is arranged in an upper portion of the internal space (hereinafter, this first light guide 10 may be referred to as "upper first light guide 10"), and the other first light guide 10 is arranged in a lower portion of the internal space (hereinafter, this first light guide 10 may be referred to as "lower first light guide 10"). The upper first light guide 10 is arranged farther toward the rear than the lower first light guide 10 is (see FIG. 2). The second light guide 20 is arranged between these two first light guides 10. The extensions 3 are also members that are long in the right-left direction. The extensions 3 are arranged with one covering an upper portion of the upper first light guide 10, and the other covering a lower portion of the lower first light guide 10.

Figure 3:
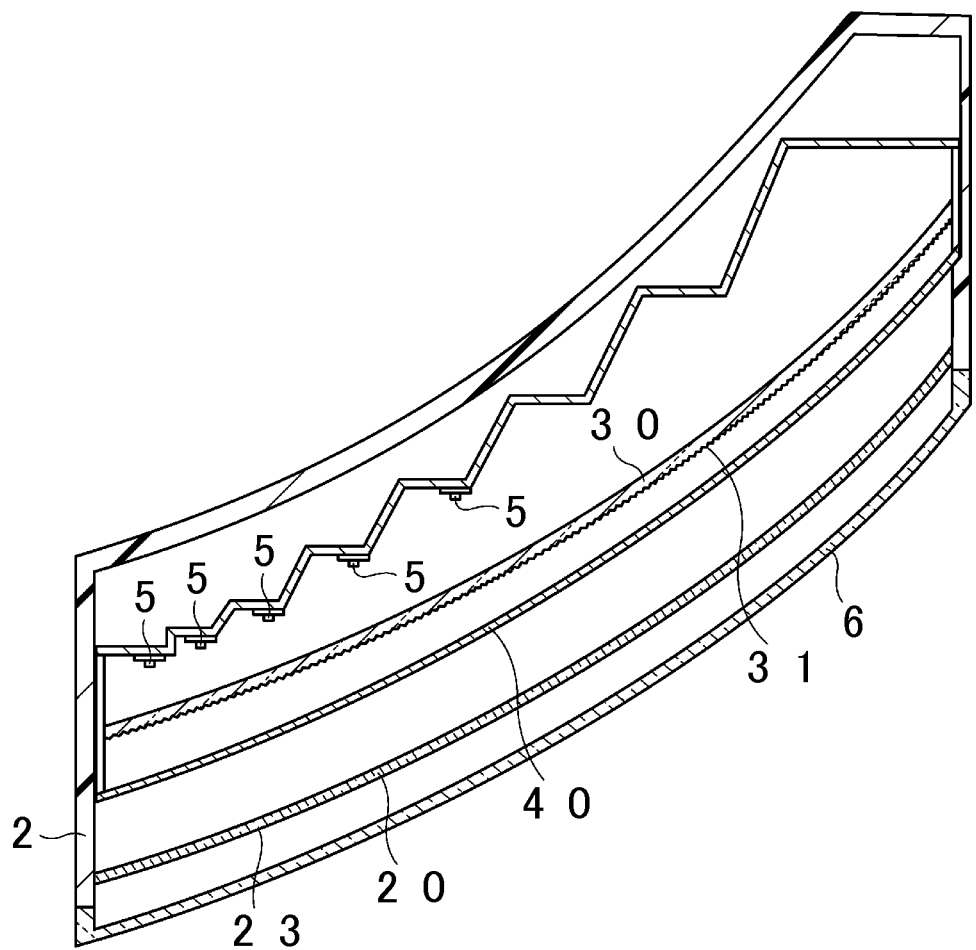
FIG. 3 is a sectional view taken along line III-III in FIG. 1.

FIG. 2 is a sectional view taken along line II-II in FIG. 1. FIG. 3 is a sectional view taken along line III-III in FIG. 1. As shown in FIGS. 2 and 3, the vehicular lamp 1 includes a plurality of first Light Emitting Diodes (LEDs) 4 (one example of a light emitter), a plurality of second LEDs 5 (one example of a supplementary light source), the two first light guides 10, the second light guide 20, a first lens member 30 (a lens member), and a second lens member 40. The first light guides 10, the second light guide 20, the first lens member 30, and the second lens member 40 are all transparent resin members.

In this example embodiment, the first light guides 10 and the second light guide 20 are integrally formed (as a single piece). In the cross-section shown in FIG. 2, the first light guides 10 extend in a front-back direction (one example of a first direction) of the lamp, and the second light guide 20 extends in an up-down direction (one example of a second direction) that intersects the front-back direction.

The first LEDs 4 are arranged to the rear of the first light guides 10. The first LEDs 4 are fixed to a housing 2 via a supporting substrate with light emitting surfaces facing forward.

The second LEDs 5 are arranged between the upper first light guide 10 and the lower first light guide 10 in the up-down direction, and rearward of the second light guide 20. The second LEDs 5 are also fixed to the housing 2 via a supporting substrate with light emitting surfaces facing forward. As shown in FIG. 3, the second LEDs 5 are arranged on a plane perpendicular to the up-down direction (horizontal plane). Although not shown, the first LEDs 4 are also arranged on planes perpendicular to the up-down direction (horizontal planes), similar to the second LEDs 5.

Each first light guide 10 has a first incident surface 11, a first light guiding portion 12, a first light emission surface 13, and a first reflecting surface 14.

The first incident surface 11 is a surface that is provided on a rear end of the first light guide 10, and receives the light emitted from the first LED 4. The first incident surface 11 is a convex surface that bulges out rearward, and collects the light emitted from the first LED 4 and directs it to the first light guiding portion 12.

The first light guiding portion 12 is a portion that extends forward from the first incident surface 11. The first light guiding portion 12 totally reflects the incident light that enters the first light guide 10 through the first incident surface 11 and guides it forward.

The first light emission surface 13 is provided on a front end of the first light guide 10, and emits the light guided by the first light guiding portion 12 forward. A diffusion step is provided on the first light emission surface 13. Light that reaches the first light emission surface 13 is diffused and emitted forward.

The first reflecting surface 14 is provided between the first incident surface 11 and the first light emission surface 13 in the front-back direction. The first reflecting surface 14 is provided forward of the center in the front-back direction, but farther to the rear than the first light emission surface 13. The first reflecting surface 14 is provided on the opposite side of the first light guiding portion 12 from the second light guide 20. That is, the second light guide 20 is positioned below the upper first light guide 10, and the first reflecting surface 14 is provided on an upper portion of the first light guiding portion 12 of the upper first light guide 10. Also, the second light guide 20 is positioned above the lower first light guide 10, and the first reflecting surface 14 is provided on a lower portion of the first light guiding portion 12 of the lower first light guide 10. The extensions 3 are provided covering these first reflecting surfaces 14, in a front view.

The second light guide 20 is a plate member with a convex surface that extends in the up-down direction and bulges out forward, in the cross-section shown in FIG. 2. Light emitted from the first LED 4 and reflected by the first reflecting surface 14 of the first light guide 10 enters the second light guide 20. This second light guide 20 is provided near a position where the first reflecting surface 14 of the first light guide 10 is formed, in the front-back direction. The second light guide 20 is formed connecting the upper first light guide 10 and the lower first light guide 10 together. The thickness of the second light guide 20 becomes smaller farther away from the first light guides 10. In this example embodiment, the thickness of the intermediate portion in the up-down direction is the smallest in the second light guide 20.

The second light guide 20 has a second light emission surface 21 and a second reflecting surface 22. The second light emission surface 21 is provided on a front surface of the second light guide 20, and is arranged facing the front of the lamp. The second light emission surface 21 is a convex surface that bulges out forward. The second light emission surface 21 extends in the up-down direction, and emits the light that enters the second light guide 20 after being reflected by the first reflecting surface 14, forward. First steps 23 (see FIG. 4) formed by a plurality of cylindrical steps that extend in the up-down direction are provided on the second light emission surface 21. The second light guide 20 transmits light emitted from the second LEDs 5, and emits the light from the second LEDs 5 forward.

The second reflecting surface 22 is provided on a rear surface of the second light guide 20. The second reflecting surface 22 is a concave surface that is recessed forward. The second reflecting surface 22 reflects the light that enters the second light guide 20 after being reflected by the first reflecting surface 14, toward the second light emission surface 21. As a result, the light reflected by the second reflecting surface 22, and light that enters the second light guide 20 after being reflected by the first reflecting surface 14 and then reaches the second light emission surface 21 directly, is emitted forward from the second light emission surface 21. A plurality of total reflection steps are provided on the second reflecting surface 22. These total reflection steps may be formed by line-shaped asperities, dots, or grains, or the like, for example.

The first lens member 30 (a lens member) is a plate member that bulges out forward. The first lens member 30 is arranged between the upper first light guide 10 and the lower first light guide 10 in the up-down direction, and is arranged between the second LEDs 5, and the second lens member 40 in the front-back direction. Second steps 31 formed of a plurality of triangular pyramids are provided on a front surface of the first lens member 30. These second steps 31 diffuse the light emitted from the second LEDs 5.

The second lens member 40 is a plate member with a normal line that faces forward. The second lens member 40 is arranged between the upper first light guide 10 and the lower first light guide 10 in the up-down direction, and between the second light guide 20 and the first lens member 30 in the front-back direction. Half deposition is performed on a front surface of the second lens member 40. The front surface of the second lens member 40 reflects light from the outside and transmits the light from the inside. Therefore, when the second LEDs 5 are not turned on, neither the first lens member 30 nor the second LEDs 5 are visible from the outside due to the second lens member 40. When the second LEDs 5 are turned on, the second lens member 40 transmits the light emitted from the second LEDs 5 and passed through the first lens member 30, forward.

With the vehicular lamp 1 according to this example embodiment, as shown in FIG. 2, the light emitted from the first LED 4 enters the first incident surface 11 and guided forward while being repeatedly internally reflected by the first light guiding portion 12. The light that reaches the first reflecting surface 14 is reflected toward the second light guide 20 by the first reflecting surface 14. The light that reaches the first light emission surface 13 is emitted forward from the first light emission surface 13. As a result, the first light emission surface 13 is illuminated.

The light emitted from the first LED 4 and reflected by the first reflecting surface 14 enters to the second light guide 20. Some of the light that enters the second light guide 20 is reflected toward the second light emission surface 21 by the second reflecting surface 22. The second light emission surface 21 emits the light reflected by the second reflecting surface 22, and the light that enters the second light guide 20 and reaches the second light emission surface 21 directly, forward. As a result, the second light emission surface 21 is illuminated.

According to this kind of structure, by turning on the first LED 4, the second light emission surface 21 of the second light guide 20, in addition to the first light emission surface 13 of the first light guide 10, is illuminated, so a larger light emitting surface area is able to be ensured. Therefore, a vehicular lamp 1 that provides good visibility is able to be provided. In particular, with the vehicular lamp 1 according to this example embodiment, the first light emission surface 13 having a laterally elongated shape, as shown in FIG. 1, is illuminated sharply with high luminosity. The second light emission surface 21 has a larger area than the first light emission surface 13 does. Also, the light that enters the second light guide 20 from the first light guide 10 is attenuated as it passes through the second light guide 20, so the light emitted from the second light emission surface 21 is weaker than the light emitted from the first light emission surface 13. Therefore, in the vehicular lamp 1 of this example embodiment, the upper and lower laterally extending portions illuminated sharply and strongly are combined with the wide portion arranged between the upper and lower portions and illuminated weakly, so the vehicular lamp 1 has an excellent design. Further, in this example embodiment, the first light guide 10 and the second light guide 20 are integrally formed, so the first light emission surface 13 and the second light emission surface 21 are continuous with each other. As a result, the strong and weak light emitting portions are able to appear integrated, making the design even better.

Also, in the vehicular lamp 1 of this example embodiment, the second light guide 20 is arranged between the two first light guides 10. Therefore, the light reflected from the first reflecting surfaces 14 of the two first light guides 10 is guided to the single second light guide 20, so the second light guide 20 is illuminated brightly.

In the vehicular lamp 1 of this example embodiment, the second LEDs 5 are provided to the rear of the second light guide 20. Also, the plurality of first steps 23 are provided on the second light emission surface 21. Therefore, the first steps 23 of the second light guide 20 diffuse the light emitted from the second LEDs 5, so the second light emission surface 21 is illuminated even brighter.

Figure 4:
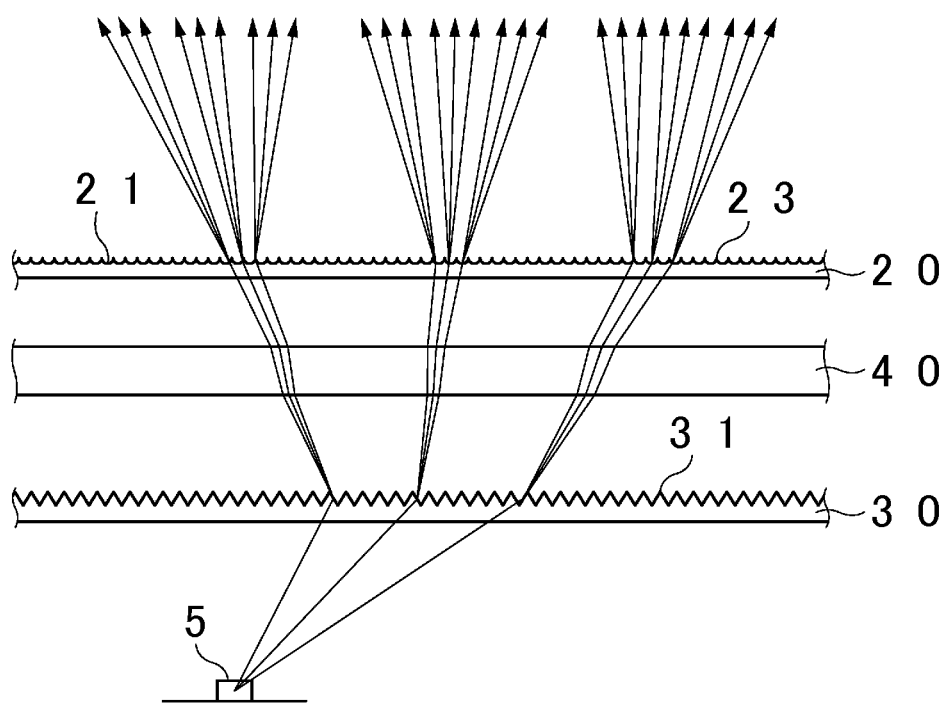
FIG. 4 is an enlarged view of a portion of FIG. 3.

FIG. 4 is an enlarged view of a portion of FIG. 3. As shown in FIG. 4, the first steps 23 that extend in the up-down direction are provided on the second light emission surface 21 of the second light guide 20, and the second steps 31 are provided on the front surface of the first lens member 30. Therefore, the light that is diffused by the second steps 31 is further diffused by the first steps 23 and then emitted forward. When viewing the light emitted through the second steps 31 that are prism steps formed by triangular pyramids or the like, only some of the refracted light is in the line of sight of an observer, so the appearance is one in which some point light is able to be seen clearly. By further providing the first steps 23 forward of the second steps 31, light that would otherwise not enter the sight is refracted by the second steps 31 so that it enters the sight, making it possible to realize an appearance in which numerous of dots are illuminated like spangled stars.

In the example embodiment described above, an example in which the first light guides 10 and the second light guide 20 are integrally formed is described, but the first light guides 10 and the second light guide 20 may also be formed separately (as separate pieces).

[Second Example Embodiment]

Figure 5:
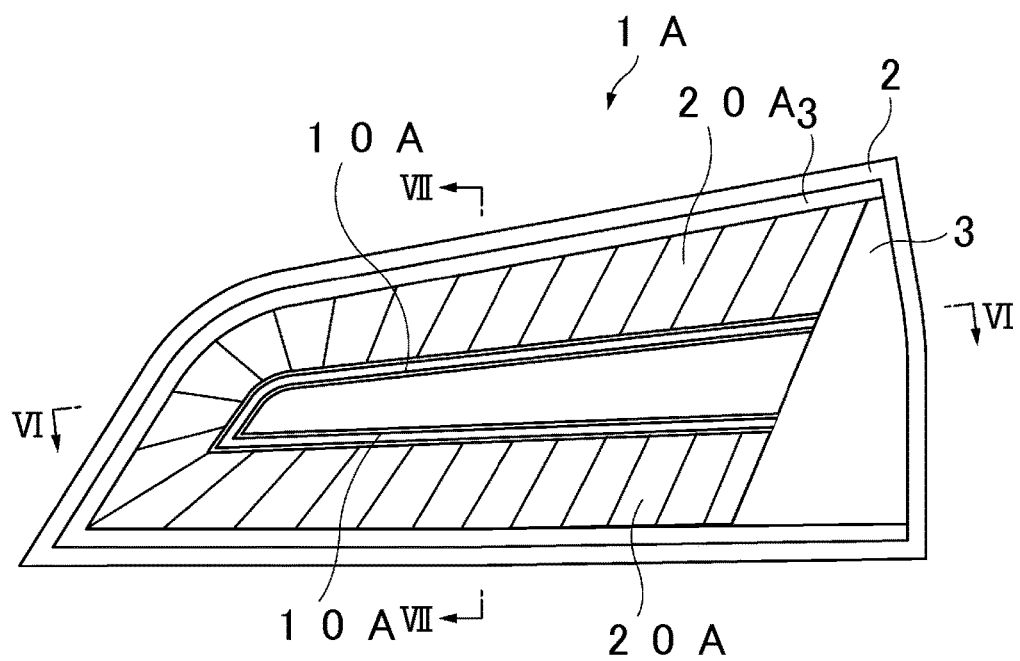
FIG. 5 is a front view of a vehicular lamp according to a second example embodiment of the invention.

FIG. 5 is a front view of a vehicular lamp 1A according to a second example embodiment of the invention. As shown in FIG. 5, a first light guide 10A is formed by a portion that is shaped like the letter "U" rotated 90° in the clockwise direction, which includes two portions (i.e., an upper portion and a lower portion) that extend in the lateral direction, and a portion that connects these two portions together at an end portion in the lateral direction, in a front view. A second light guide 20A is a member formed spreading out to the outside from the first light guide 10A, in a front view.

Figure 6:
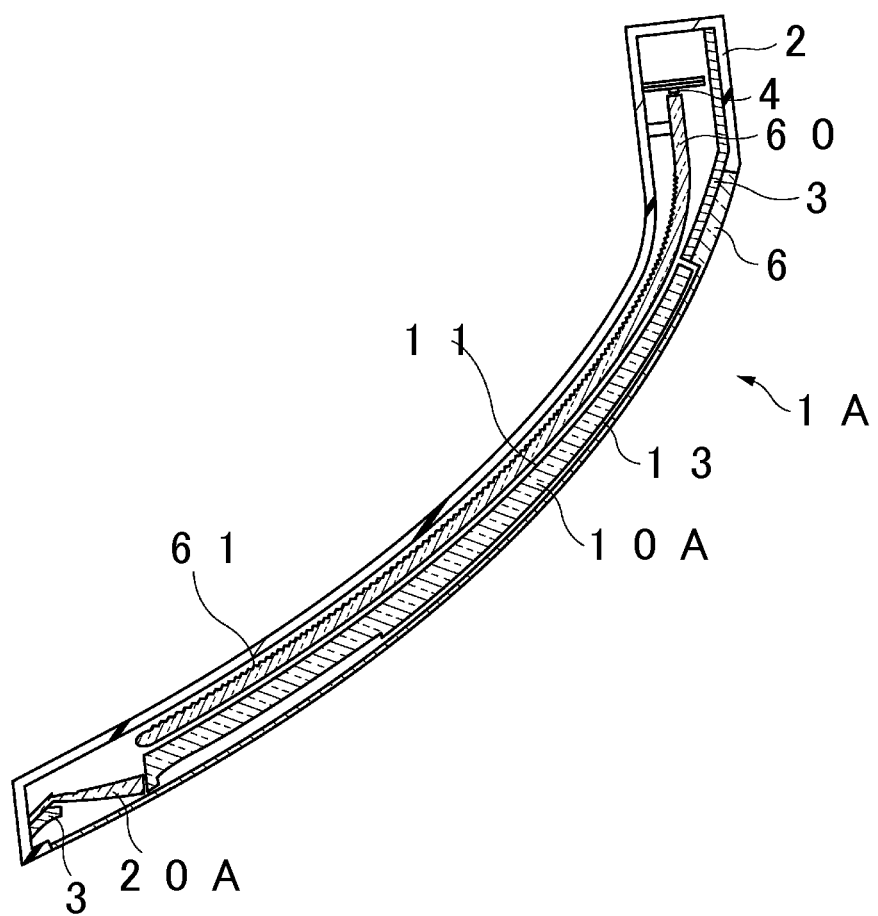
FIG. 6 is a sectional view taken along line VI-VI in FIG. 5.

FIG. 6 is a sectional view taken along line VI-VI of FIG. 5. As shown in FIG. 6, a bar-shaped light guide 60 is provided rearward of the first light guide 10A. This bar-shaped light guide 60 is a long member that extends along a rear end surface of the first light guide 10A.

A first LED 4 is arranged on an end of the bar-shaped light guide 60 in the lengthwise direction. A light emitting surface of the first LED 4 faces the end of the bar-shaped light guide 60 in the lengthwise direction. The light emitted from the first LED 4 enters the bar-shaped light guide 60 through the end of the bar-shaped light guide 60 in the lengthwise direction, and repeatedly internally reflected by the bar-shaped light guide 60, and is guided along the lengthwise direction of the bar-shaped light guide 60 while leaking (emitting) little by little from an outer peripheral surface of the bar-shaped light guide 60.

A plurality of reflective steps 61 are provided on a rear end surface of the bar-shaped light guide 60, and reflect the light emitted from the first LED 4 forward. As a result, when viewed from the front, the bar-shaped light guide 60 emits light in a line shape. Also, the first LED 4 is provided in a position where it is covered by the extensions 3 and thus is not visible from the outside in a front view, as shown in FIG. 6.

Figure 7:
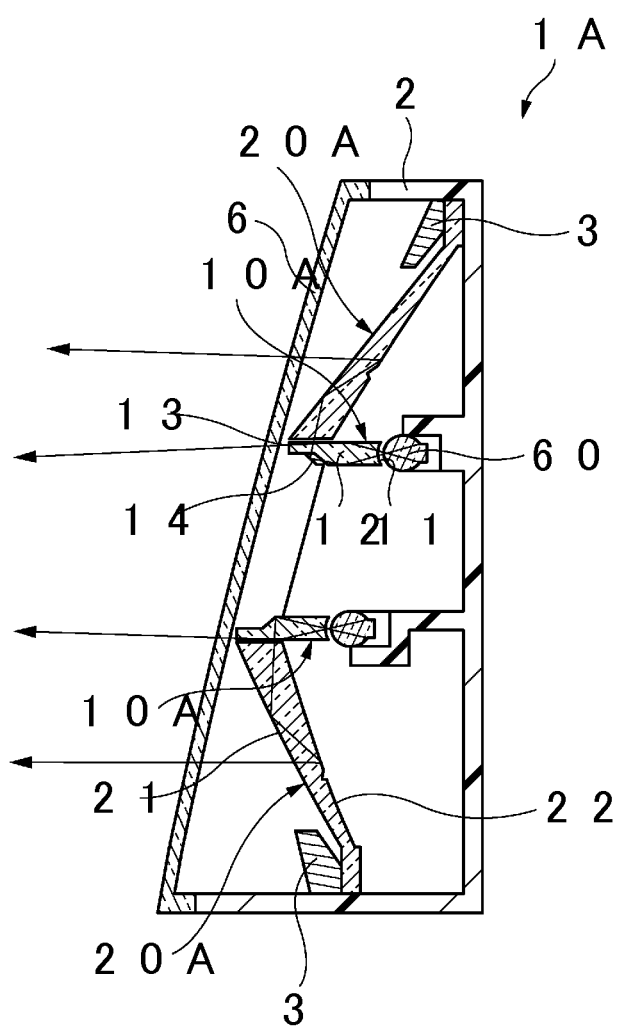
FIG. 7 is a sectional view taken along line VII-VII in FIG. 5.

FIG. 7 is a sectional view taken along line VII-VII in FIG. 5. In the cross-section shown in FIG. 7, the first light guide 10A extends in the front-back direction. The first light guide 10A has a first incident surface 11, a first light guiding portion 12, a first light emission surface 13, and a first reflecting surface 14.

The first incident surface 11 is a surface that is provided on a rear end of the first light guide 10A in the front-back direction, and receives light emitted from the bar-shaped light guide 60. The first incident surface 11 is a concave surface that is recessed forward. This first incident surface 11 collects the light emitted from the bar-shaped light guide 60 and guides it toward the first light guiding portion 12.

The first light guiding portion 12 extends forward from the first incident surface 11. The first light guiding portion 12 totally reflects the incident light that enters the first light guide 10A through the first incident surface 11 and guides it forward.

The first light emission surface 13 is provided on a front end of the first light guide 10A, and emits the light guided by the first light guiding portion 12 forward.

The first reflecting surface 14 is provided between the first incident surface 11 and the first light emission surface 13 in the front-back direction. The first reflecting surface 14 is provided farther forward than the center in the front-back direction, and farther to the rear than the first light emission surface 13. The first reflecting surface 14 is provided on the opposite side of the first light guiding portion 12 from the second light guide 20A. That is, the second light guide 20A is positioned above the upper first light guide 10A, and the first reflecting surface 14 is provided on a lower portion of the first light guiding portion 12 of the upper first light guide 10A. Also, the second light guide 20A is positioned below the lower first light guide 10A, and the first reflecting surface 14 is provided on an upper portion of the first light guiding portion 12 of the lower first light guide 10A.

In the cross-section shown in FIG. 7, the second light guide 20A is a plate member that extends in the up-down direction. Light reflected by the first reflecting surface 14 after being emitted from the first LED 4 and guided by the bar-shaped light guide 60 enters the second light guide 20A. The second light guide 20A has a second light emission surface 21, and a second reflecting surface 22. The second light guide 20A is provided near a position where the first reflecting surface 14 of the first light guide 10A is formed, in the front-back direction. The thickness of the second light guide 20A becomes smaller farther away from the first light guide 10A. In this example embodiment, the upper second light guide 20A becomes thinner farther upward, and the lower second light guide 20A becomes thinner farther downward.

The second light emission surface 21 is provided on a front surface of the second light guide 20A, and is arranged facing the front of the lamp. The second light emission surface 21 extends in the up-down direction.

The second reflecting surface 22 is provided on a rear surface of the second light guide 20A. The second reflecting surface 22 reflects the light that enters the second light guide 20A after being reflected by the first reflecting surface 14, toward the second light emission surface 21. As a result, the light reflected by the second reflecting surface 22 and the light that enters the second light guide 20A after being reflected by the first reflecting surface 14 and then reaches the second light emission surface 21 directly are emitted forward from the second light emission surface 21.

In this way, with the vehicular lamp 1A of this example embodiment, the use of the bar-shaped light guide 60 enables light with little luminescent unevenness in the lengthwise direction to enter the first light guide 10A, so the first light emission surface 13 is illuminated with even brightness. Also, the bar-shaped light guide 60 is able to radiate a wide area with a small light source, so cost performance is high, and energy is also able to be saved. Further, compared to when the lamp is formed using only the bar-shaped light guide 60, a larger light emitting area is able to be ensured by the first light guide 10A and the second light guide 20A, so the visibility of the vehicular lamp 1A is increased.

[Third Example Embodiment]

Figure 8:
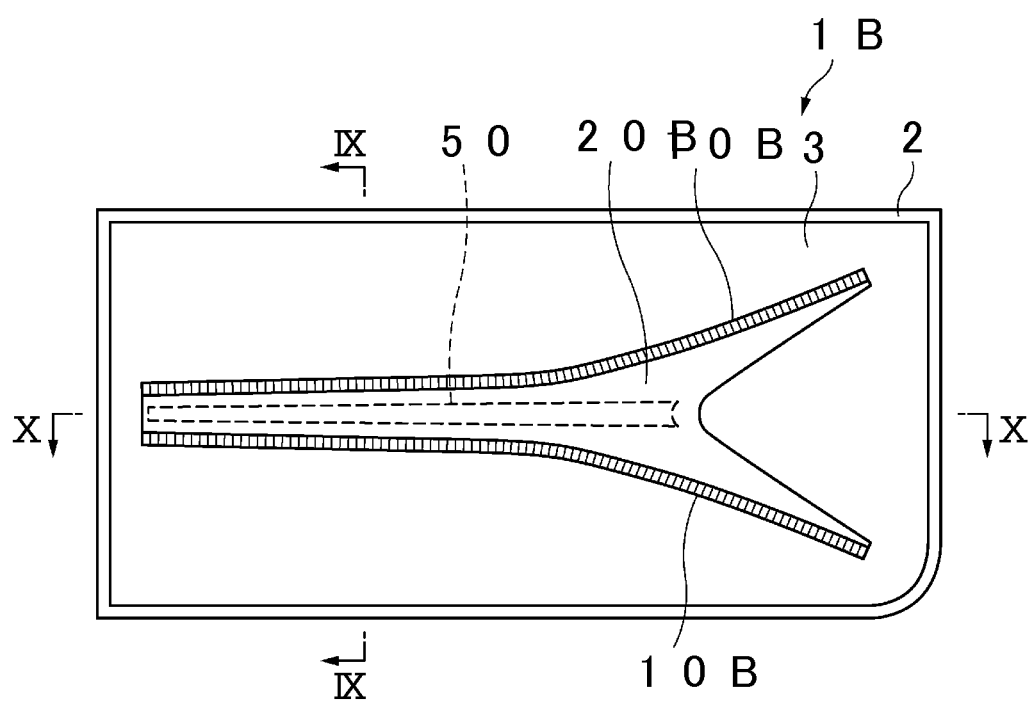
FIG. 8 is a front view of a vehicular lamp according to a third example embodiment of the invention.

FIG. 8 is a front view of a vehicular lamp 1B according to a third example embodiment of the invention. As shown in FIG. 8, first light guides 10B are arranged in an upper portion and a lower portion of the lamp. The right end portion of the upper first light guide 10B is curved upward. The right end portion of the lower first light guide 10B is curved downward. A second light guide 20B is arranged between the upper first light guide 10B and the lower first light guide 10B. A third lens member 50 that extends in the lateral direction is provided to the rear of the second light guide 20B.

Figure 9:
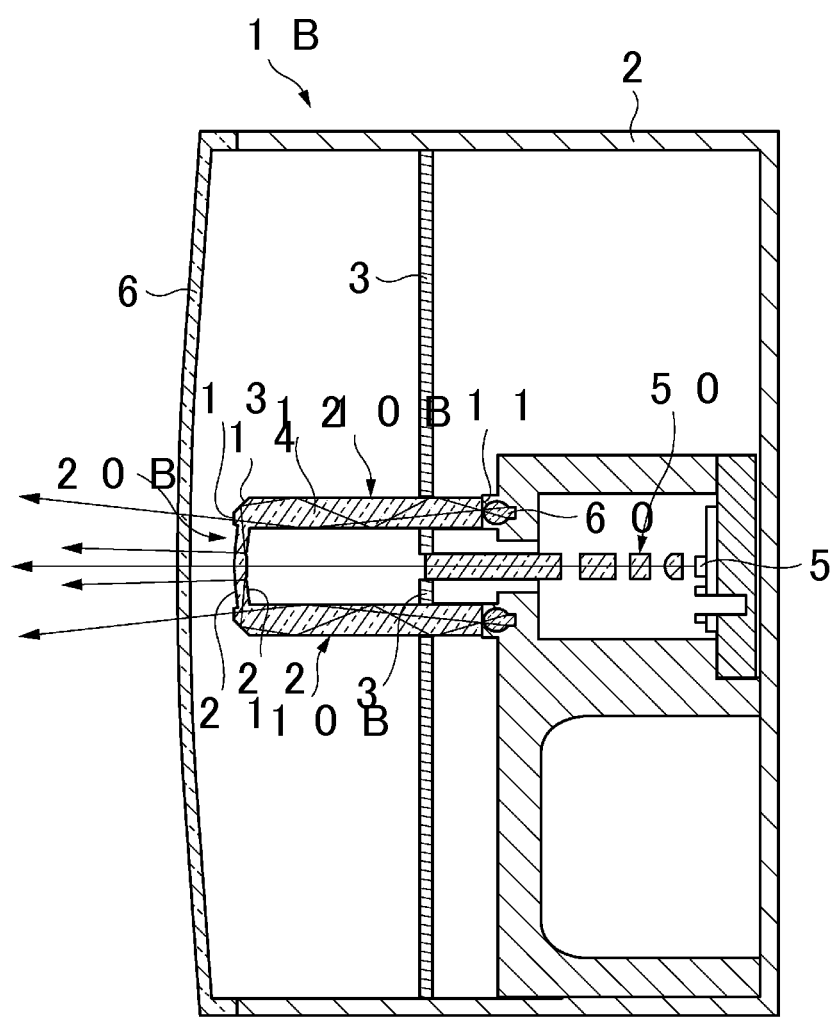
FIG. 9 is a sectional view taken along line IX-IX in FIG. 8.

FIG. 9 is a sectional view taken along line IX-IX in FIG. 8. In the cross-section shown in FIG. 9, the first light guides 10B extend in the front-back direction. Each of the first light guides 10B has a first incident surface 11, a first light guiding portion 12, a first light emission surface 13, and a first reflecting surface 14.

The first incident surface 11 is a surface that is provided on a rear end of the first light guide 10B in the front-back direction, and receives light emitted from the bar-shaped light guide 60. The first incident surface 11 is a concave surface that is recessed forward. This first incident surface 11 collects the light emitted from the bar-shaped light guide 60 and guides it toward the first light guiding portion 12. Although not shown, light from the first LED 4 arranged on an end of the bar-shaped light guide 60 in the lengthwise direction enters the bar-shaped light guide 60, just as in the second example embodiment described above.

The first light guiding portion 12 extends forward from the first incident surface 11. The first light guiding portion 12 totally reflects the incident light that enters the first light guide 10B through the first incident surface 11 and guides it forward.

The first light emission surface 13 is provided on a front end portion of the first light guide 10B, and emits the light guided by the first light guiding portion 12 forward.

The first reflecting surface 14 is provided between the first incident surface 11 and the first light emission surface 13 in the front-back direction. The first reflecting surface 14 is provided farther forward than the center in the front-back direction, and farther to the rear than the first light emission surface 13. The first reflecting surface 14 is provided on the opposite side of the first light guiding portion 12 from the second light guide 20B. That is, the second light guide 20B is positioned below the upper first light guide 10B, and the first reflecting surface 14 is provided on an upper portion of the first light guiding portion 12 of the upper first light guide 10B. Also, the second light guide 20B is positioned above the lower first light guide 10B, and the first reflecting surface 14 is provided on a lower portion of the first light guiding portion 12 of the lower first light guide 10B.

In the cross-section shown in FIG. 9, the second light guide 20B is a plate member that extends in the up-down direction. The second light guide 20B is integrally formed with the first light guide 10B. Light reflected by the first reflecting surface 14 after being emitted from the first LED 4 and guided by the bar-shaped light guide 60 enters the second light guide 20B. The second light guide 20B has a second light emission surface 21, and a second reflecting surface 22. The second light guide 20B is provided near a position where the first reflecting surface 14 of the first light guide 10B is formed, in the front-back direction.

The second light emission surface 21 is provided on a front surface of the second light guide 20B, and is arranged facing the front of the lamp. The second light emission surface 21 extends in the up-down direction.

The second reflecting surface 22 is provided on a rear surface of the second light guide 20B. The second reflecting surface 22 reflects the light that enters the second light guide 20B after being reflected by the first reflecting surface 14, toward the second light emission surface 21. As a result, the light reflected from the second reflecting surface 22 and the light that enters the second light guide 20B after being reflected by the first reflecting surface 14 and then reaches the second light emission surface 21 directly, are emitted forward from the second light emission surface 21.

Figure 10:
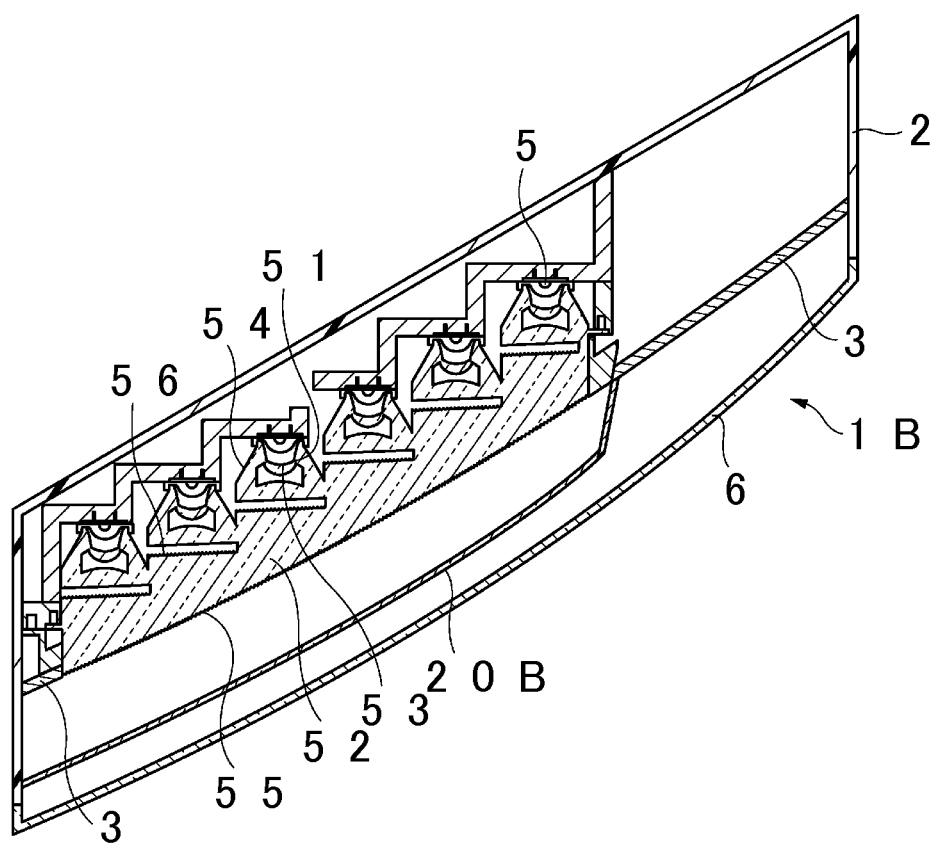
FIG. 10 is a sectional view taken along line X-X in FIG. 8.

FIG. 10 is a sectional view taken along line X-X in FIG. 8. As shown in FIG. 10, a plurality of second LEDs 5 are arranged in the lateral direction. The third lens member 50 is arranged forward of the second LEDs 5. As shown in FIG. 10, the third lens member 50 that extends in the lateral direction is provided forward of the plurality of second LEDs 5. The third lens member 50 has a first portion 51 and a second portion 52 that are both positioned in front of each second LED 5. The first portion 51 includes a lens portion 53, and a side surface 54 that is a totally reflecting surface. A plurality of front diffusion steps 55 are provided on a front surface of the second portion 52. A plurality of rear diffusion steps 56 are provided on a rear surface of the second portion 52.

The first portion 51 of the third lens member 50 generates parallel light from the light emitted from the second LED 5 via the lens portion 53 and the side surface 54, and sends the parallel light to the rear diffusion steps 56 of the second portion 52. The front diffusion steps 55 of the second portion 52 further diffuse the light diffused by the rear diffusion steps 56, and emit it forward. As a result, the front surface of the third lens member 50 is illuminated evenly by the light emitted from the second LEDs 5.

In the example embodiment described above, an example in which the invention is applied to a rear combination lamp is described, but the invention may also be applied to a headlamp.

Also, in the example embodiment described above, an example is described in which the first direction in which the first light guide extends is the front-back direction of the lamp, but the first direction may also be the lateral direction of the lamp, an inclined direction when viewed from the front, or an inclined direction when viewed from above, or the like.

As described above, an aspect of the invention relates to a vehicular lamp including: a light emitter; a first light guide that extends in a first direction; and a second light guide that extends in a second direction that intersects the first direction. The first light guide has: a first incident surface that is provided on one end of the first light guide in the first direction and receives light emitted from the light emitter; a first light guiding portion that guides light that enters the first light guide through the first incident surface to the other end of the first light guide in the first direction; a first light emission surface that is provided on the other end of the first light guide in the first direction, and emits light guided by the first light guiding portion; and a first reflecting surface that is provided between the first incident surface and the first light emission surface in the first direction and on an opposite side of the first light guiding portion from the second light guide, and that reflects light guided by the first light guiding portion in a direction toward the second light guide. The second light guide has: a second light emission surface that extends in the second direction, and emits light that enters the second light guide after being reflected by the first reflecting surface; and a second reflecting surface that is provided on a surface of the second light guide that is on a side opposite the side on which the second light emission surface is provided, and that reflects light that enters the second light guide after being reflected by the first reflecting surface, toward the second light emission surface.

The vehicular lamp may include at least two of the first light guides, and the second light guide may be arranged between the first light guides. According to this structure, the two first light guides send light to both ends of the second light guide, so the second light guide is illuminated brightly, enabling visibility to be increased.

The light emitter may include a light source and a bar-shaped light guide, and light emitted from the light source may be guided into the bar-shaped light guide and emitted from an outer peripheral surface of the bar-shaped light guide. According to this structure, the use of the bar-shaped light guide enables light with little luminescent unevenness to enter the first light guide. Also, the bar-shaped light guide is able to radiate a wide area with a small light source, so cost performance is high, and energy is also able to be saved.

The second light emission surface may be arranged facing a front of the lamp, a plurality of first steps may be provided on the second light emission surface, a supplementary light source may be arranged farther rearward than the second light guide, and the second light guide may transmit light emitted from the supplementary light source and emits the light out in front of the lamp.

According to this structure, light emitted from the supplementary light source enters the second light guide, so the second light guide is illuminated brightly, which enables visibility to be further increased. Also, the plurality of first steps diffuse and emit both the light guided by the second light guide and emitted from the second light emission surface, and the light emitted from the supplementary light source and then emitted from the second light emission surface, thus enabling visibility to be further increased.

The vehicular lamp may further includes a lens member that is provided between the second light guide and the supplementary light source, and has a plurality of second steps that diffuse the light emitted from the supplementary light source.

According to this structure, light is emitted with being diffused, so visibility is increased.

What is claimed is:

1. A vehicular lamp comprising:
    a light emitter;
    a first light guide that extends in a first direction; and
    a second light guide that extends in a second direction that intersects the first direction,
    the first light guide having:
        a first incident surface that is provided on one end of the first light guide in the first direction and receives light emitted from the light emitter;
        a first light guiding portion that guides light that enters the first light guide through the first incident surface to the other end of the first light guide in the first direction;
        a first light emission surface that is provided on the other end of the first light guide in the first direction, and emits light guided by the first light guiding portion; and
        a first reflecting surface that is provided between the first incident surface and the first light emission surface in the first direction and on an opposite side of the first light guiding portion from the second light guide, and that reflects light guided by the first light guiding portion in a direction away from the first light emission surface and toward the second light guide such that only a portion of the light emitted from the light emitter is directed toward the first light emission surface with the remainder being directed toward the second light guide, and
    the second light guide having:
        a second light emission surface that extends in the second direction, and emits light that enters the second light guide after being reflected by the first reflecting surface; and
        a second reflecting surface that faces the second light emission surface is provided on a surface of the second light guide that is on a side opposite the side on which the second light emission surface is provided, and that reflects light that enters the second light guide after being reflected by the first reflecting surface, toward the second light emission surface, wherein the second light emission surface and the second reflecting surface both extend along the second direction.

2. The vehicular lamp according to claim 1, wherein:
the vehicular lamp includes at least two of the first light guides; and
the second light guide is arranged between the first light guides.

3. The vehicular lamp according to claim 1, wherein:
the light emitter includes a light source and a bar-shaped light guide; and
light emitted from the light source is guided into the bar-shaped light guide and emitted from an outer peripheral surface of the bar-shaped light guide.

4. The vehicular lamp according to claim 1, wherein:
the second light emission surface is arranged facing a front of the lamp;
a plurality of first steps are provided on the second light emission surface;
a supplementary light source is arranged farther rearward than the second light guide; and
the second light guide transmits light emitted from the supplementary light source and emits the light out in front of the lamp.

5. The vehicular lamp according to claim 4, further comprising a lens member that is provided between the second light guide and the supplementary light source, and has a plurality of second steps that diffuse the light emitted from the supplementary light source.

6. The vehicular lamp according to claim 1, wherein:
light reflected by the first reflecting surface enters the second light guide between the first incident surface and the first light emission surface.

7. The vehicular lamp according to claim 1, wherein the first light emission surface and the second light emission surface both emit light in a direction substantially parallel to the first direction.

8. A vehicular lamp comprising:
a light emitter;
a first light guide that extends in a first direction; and
a second light guide that extends in a second direction that intersects the first direction,
the first light guide having:
a first incident surface that is provided on one end of the first light guide in the first direction and receives light emitted from the light emitter;
a first light guiding portion that guides light that enters the first light guide through the first incident surface to the other end of the first light guide in the first direction;
a first light emission surface that is provided on the other end of the first light guide in the first direction, and emits light guided by the first light guiding portion; and
a first reflecting surface that is provided between the first incident surface and the first light emission surface in the first direction and on an opposite side of the first light guiding portion from the second light guide, and that reflects light guided by the first light guiding portion in a direction away from the first light emission surface and toward the second light guide such that only a portion of the light emitted from the light emitter is directed toward the first light emission surface with the remainder being directed toward the second light guide, and the second light guide having:
a second light emission surface that extends in the second direction, and emits light that enters the second light guide after being reflected by the first reflecting surface; and
a second reflecting surface that faces the second light emission surface is provided on a surface of the second light guide that is on a side opposite the side on which the second light emission surface is provided, and that reflects light that enters the second light guide after being reflected by the first reflecting surface, toward the second light emission surface, wherein the second light emission surface is arranged facing a front of the lamp;
a plurality of first steps are provided on the second light emission surface;
a supplementary light source is arranged farther rearward than the second light guide;
the second light guide transmits light emitted from the supplementary light source and emits the light out in front of the lamp, and
wherein the vehicular lamp further comprises a lens member that is provided between the second light guide and the supplementary light source, and has a plurality of second steps that diffuse the light emitted from the supplementary light source.

9. A vehicular lamp comprising:
a light emitter;
a first light guide that extends in a first direction; and
a second light guide that extends in a second direction that intersects the first direction,
the first light guide having:
a first incident surface that is provided on one end of the first light guide in the first direction and receives light emitted from the light emitter;
a first light guiding portion that guides light that enters the first light guide through the first incident surface to the other end of the first light guide in the first direction;
a first light emission surface that is provided on the other end of the first light guide in the first direction, and emits light guided by the first light guiding portion; and
a first reflecting surface that is provided between the first incident surface and the first light emission surface in the first direction and on an opposite side of the first light guiding portion from the second light guide, and that reflects light guided by the first light guiding portion in a direction away from the first light emission surface and toward the second light guide such that only a portion of the light emitted from the light emitter is directed toward the first light emission surface with the remainder being directed toward the second light guide, and the second light guide having:
a second light emission surface that extends in the second direction, and emits light that enters the second light guide after being reflected by the first reflecting surface; and
a second reflecting surface that faces the second light emission surface is provided on a surface of the second light guide that is on a side opposite the side on which the second light emission surface is provided, and that reflects light that enters the second light guide after being reflected by the first reflecting surface, toward the second light emission surface, wherein the vehicular lamp includes at least two of the first light guides, and the second light guide is arranged between the first light guides.

* * * * *